(12) United States Patent
Sasaki et al.

(10) Patent No.: US 6,337,120 B1
(45) Date of Patent: Jan. 8, 2002

(54) GASKET FOR LAYER-BUILT FUEL CELLS AND METHOD FOR MAKING THE SAME

(75) Inventors: Yasunori Sasaki, Kamakura; Kazuhisa Senda, Fujisawa; Osamu Nagai, Hiratsuka; Shigeo Wakamatsu, Fujisawa; Osamu Ando, Yamato; Tadashi Fujimoto, Chigasaki, all of (JP)

(73) Assignee: NOK Corporation, Tokyo (JP)

( * ) Notice: Subject to any disclaimer, the term of this patent is extended or adjusted under 35 U.S.C. 154(b) by 0 days.

(21) Appl. No.: 09/339,118

(22) Filed: Jun. 24, 1999

(30) Foreign Application Priority Data

Jun. 26, 1998 (JP) ............................................. 10-180976
Oct. 28, 1998 (JP) ............................................. 10-307199
Jan. 13, 1999 (JP) ............................................. 11-005982

(51) Int. Cl.⁷ .................................................. B32B 3/02
(52) U.S. Cl. ................... 428/66.04; 81/304.4; 81/306.6; 81/308.4; 81/408
(58) Field of Search ........................ 428/66.4, 81, 198, 428/304.4, 306.6, 308.4, 408; 429/35, 34, 12, 42, 40

(56) References Cited

U.S. PATENT DOCUMENTS 6,057,054 A * 5/2000 Barton et al. .................. 429/42

FOREIGN PATENT DOCUMENTS

| JP | 58-78372 | 5/1983 |
| JP | 59-68171 | 4/1984 |
| JP | 7-153480 | 6/1995 |
| JP | 7-226220 | 8/1995 |
| JP | 7-263004 | 10/1995 |
| JP | 7-312223 | 11/1995 |
| JP | 9-231987 | 9/1997 |
| WO | WO92/22096 | 12/1992 |

* cited by examiner

Primary Examiner—Deborah Jones
Assistant Examiner—Abraham Bahta
(74) Attorney, Agent, or Firm—Jacobson Holman, PLLC

(57) ABSTRACT

A gasket is provided on a porous sheet in one body. The gasket is thin and has an excellent sealability, and processability when the gasket is built in layer-built fuel cells. The gasket is made of liquid rubber and has a hardness not more than 60 (JIS A). Liquid perfluoro rubber and liquid silicone rubber is preferably used for the gasket. And gasket can be made by injection molding.

10 Claims, 9 Drawing Sheets

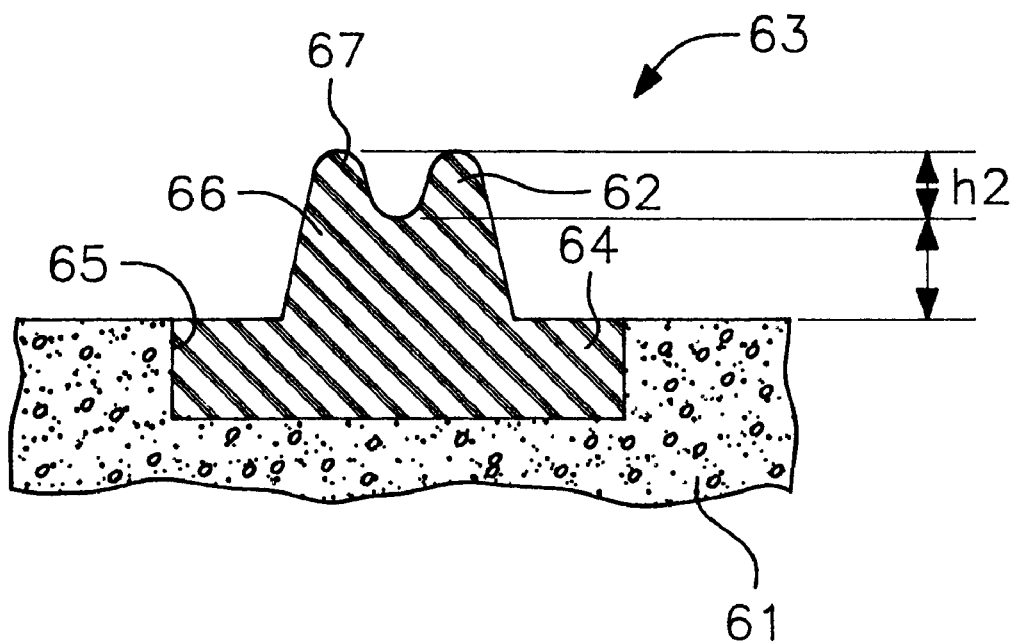
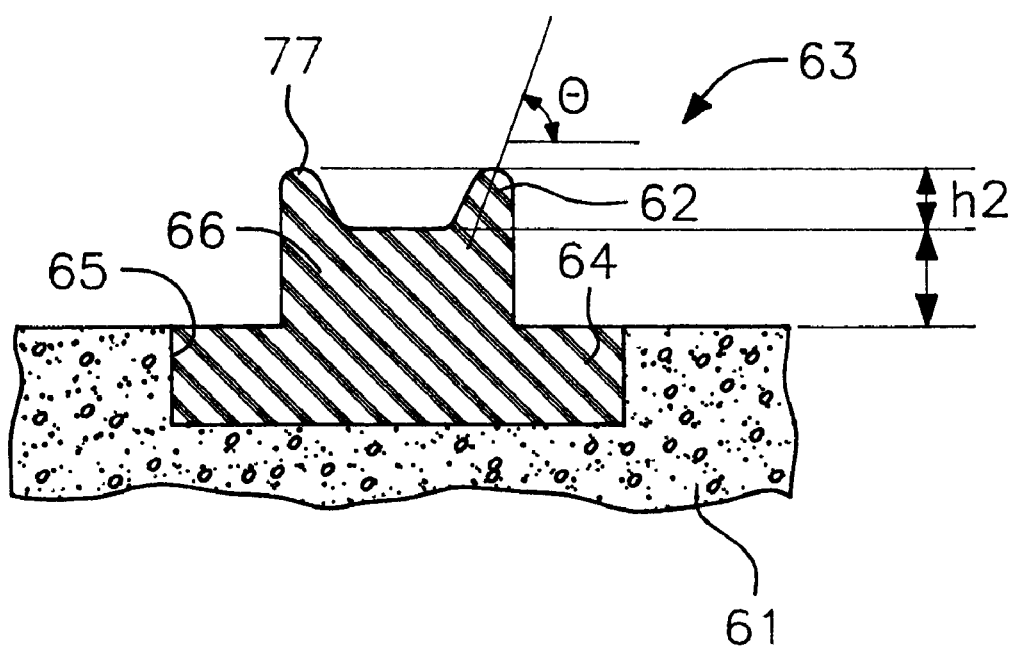

GASKET FOR LAYER-BUILT FUEL CELLS AND METHOD FOR MAKING THE SAME

BACKGROUND OF THE INVENTION

1. Field of the Invention

The present invention relates to a gasket for layer-built fuel cells. More precisely, the present invention relates to a gasket, for a sheet component of the layer-built fuel cells, having an excellent sealability when used in the layer-built fuel cells. Moreover the present invention relates to a gasket having an excellent processability when the layer-built fuel cell s is assembled.

Still more, the present invention relates to a method for making a gasket, for a sheet component of the layer-built fuel cells, having an excellent sealability when used in the layer-built fuel cells.

2. Description of the Related Art

Fuel cells, electrochemical device for continuously converting chemicals—a fuel (hydrogen) and an oxydant (oxygen)—into direct current electricity, have electronic-conductor electrodes on which electrochemical reactions are taking place. The electrodes—a fuel electrode and an oxygen electrode—are usually coated with a fine powder of platinum-based catalysts thereon. Generation of electricity is carried out through electrochemical reactions which differ from a conventional oxidation reactions.

As for electrodes of the fuel cells, materials having a high electronic conductivity, an excellent stability for electrochemical reactions and an excellent anti-degradation property for electrolytes such as phosphoric acid or the like, have been used so far. For example, an amorphous carbon, or a powder or a fiber made of graphite, has been used conventionally. Especially, electrodes made of carbon easily accept electrons from hydrogen, a fuel, when hydrogen is ionized during electrode reactions. The electron accepted by electrodes becomes electric current and electric voltage. Carbon electrodes have also high electric conductivity and facilitate ionization of hydrogen in the electrode reaction.

Since reactions on the electrodes are carried out by contact processes between gas (a fuel) and a solid (electrode), the surface of the electrodes is required to be as large as possible for securing the speed of the reaction. This means that the electrodes should have porous structure in its surface portion to secure large contact surface area between gas and the electrodes. Carbon having excellent electron conductivity is generally stiff and brittle so that the physical strength of the carbon plate having porous structure (porosity is in the range of from about 40% to about 70%) tends to become low. These carbon plates are used in fuel cells as a current-collecting electrode (separator), a reaction electrode or the like. Fuel cells are built up using these sheet-like components such as the current-collecting electrode, the reaction electrode and an ion-exchange membrane.

Moreover, fuel cells are required to be sealed so as not to leak fuel gas (hydrogen, oxygen or the like) and liquid (liquid electrolyte or water produced in the electrochemical reaction) from the fuel cells in order to secure efficiency of power generation, longevity and stability of the device or the like. Especially, these fuel gasses or liquids tend to leak or permeate out of the fuel cells at the periphery of the carbon plates or the ion-exchange membranes.

In order to prevent liquid or gas from leaking, various seals such as gaskets (Japanese unexamined patent 9-231987, 7-263004, 7-226220 and 7-153480), rubber plates with cellular rubber layer thereon which are used as gaskets (Japanese unexamined patent 7-312223), have conventionally been used.

As is shown in FIG. 13 which is one of prior arts, there are several components such as a current-collecting electrode (separator) 2, an ion-exchange membranes 3 interposed between a membrane-fixed reaction electrode 4, a gasket or the like. The gasket is made of a cellular rubber 6 and a rubber plate. But these prior arts did not aim at seeking seals having thin-wall, good processability in building up fuel cells, a property hard to displace from its initial sealing place, good sealability even at low sealing pressure, uniformity of sealing pressure around its circumference or the like. That is, conventional gaskets, which are not unitized with sheet-like components, can not satisfactorily provide seals with thin-wall, good processability in building up the fuel cells, a property hard to displace from its initial sealing place or the like.

What is more, fuel cells have usually hundreds of carbon electrodes and sheets (separators and ion-exchange membranes) having a thickness of from about 0.1 mm to a few mm and one side dimension of from about 10 cm to about 50 cm in square or rectangular shape. Each sheet is so thin that it tends to get wrinkled. And carbon sheets have undulation in itself. From these causes, leaks of gas or liquid from the fuel cells have often been observed at the conventional sealing portions due to displacement or uneven pressure in sheets or electrodes. There have also been a big problem concerning processability in stacking each sheet to its correct position.

Materials made of polytetrafluoroethylene resin (PTFE resin) have been generally used as a seal for a phosphoric acid type fuel cells which is now regarded as a most promising one. Polytetrafluoroethylene resin can be used as a sealing material under such a severe condition as the presence of concentrated phosphoric acid at about 200° C. in the phosphoric acid type fuel cells. Seals made of polytetrafluoroethylene resin are, however, hard in hardness so that sealing pressure must be higher to get a good sealing condition. But high sealing pressure causes breakdown of the carbon electrodes because the carbon electrodes are brittle due to its porosity mentioned above. And seals made of polytetrafluoroethylene resin have also such a shortcoming as difficulty in processing to make the seal. Ion-exchange membranes are also brittle when dried, so that strong stress added on the membranes may cause damage of the membranes.

Seals made of polytetrafluoroethylene have an excellent resistance against heat and chemicals in practical use as mentioned above, but can not completely seal the surface of the porous carbon plate because there is a convexo-concave portion on the surface of the electrode. Therefore seals made of polytetrafluoroethylene resin have been used with accepting a certain amount of leaking of fuel gasses, or used on carbon electrodes which are burnt after flattened and smoothed by coating on the surface of the carbon electrodes with polytetrafluoroethylene aqueous dispersion or the like, and then seals are pressed onto the polytetrafluoroethylene-coated carbon electrodes (Japan Unexamined Patent 58-078372, 59-068171). Therefore there have been some troubles such as time-consuming in process of manufacturing seals, instability in sealing property and difficulty in making thin-walled sealing members.

SUMMARY OF THE INVENTION

An object of the present invention is to provide a gasket, which is used for layer-built fuel cells, the gasket being low in height to allow the layer-built fuel cells to be more compact in size and showing an excellent sealing property even at a low sealing pressure. Another object of the invention is to provide a gasket, which has an excellent processability when the layer-built fuel cells are assembled.

Still another object of the present invention is to provide a method for manufacturing a gasket having no weld portion in itself, having an excellent sealability, and being used for a layer-built fuel cell.

The object of the present invention can be achieved by a gasket which is formed on a sheet component of fuel cells, and made of a liquid rubber vulcanizates having a hardness preferably not more than 60 (JIS A of JIS K 6301), the vulcanizates being unitized with the sheet.

Liquid rubbers used in the invention have a viscosity not more than $10^4$ Pa·s (at 25° C.). Liquid perfluoro rubber is preferably used in this invention because perfluoro rubber has an excellent heat resistance and chemical resistance. Moreover a polytetrafluoroethylene fine powder can preferably be added into the liquid perfluoro-rubber for decreasing gas permeability. When porous carbon plates made of fibrous carbon are used as the sheets, liquid rubbers are infiltrated into the porous carbon plates, thereby the infiltrated portions become non-permeate portions against gas or aqueous electrolyte or water produced via electrochemical reactions, and become gasket portions too.

When porous carbon plates made of carbon other than the fibrous carbon are used as the sheets, the sealing portion (gasket) is made, integrally with the porous carbon plates, on the surface of the porous carbon plate or on a groove which is formed on a surface of the porous carbon plate.

When ion-exchange membranes are used as the sheets, the sealing portion is made, integrally with the ion-exchange membrane.

The sealing portions of these cases have preferably a hardness (JIS A) not more than 60 and are made of various liquid rubber having a viscosity not more than $10^4$ Pa·s (at 25° C.).

Another object of the present invention can be achieved by a process of an injection-molding of liquid rubbers under vacuum circumstances. The molding processes of the present invention is as follows; first sucking out air in a closed space between an upper and lower mold, then closing the molds and injecting liquid rubber on a predetermined place of the surface of the porous sheet, and then curing the rubber in a predetermined period of time. There is no weld portion because no air is substantially in a cavity of the mold.

These features and advantages of the inventions will become apparent from the following description.

BRIEF DESCRIPTION OF THE DRAWINGS

FIG. 9 is a cross sectional partial view of a gasket C provided on a sheet;

FIG. 10 is a cross sectional partial view of a gasket D provided on a sheet;

DESCRIPTION OF THE PREFERRED EMBODIMENTS

Figure 1:
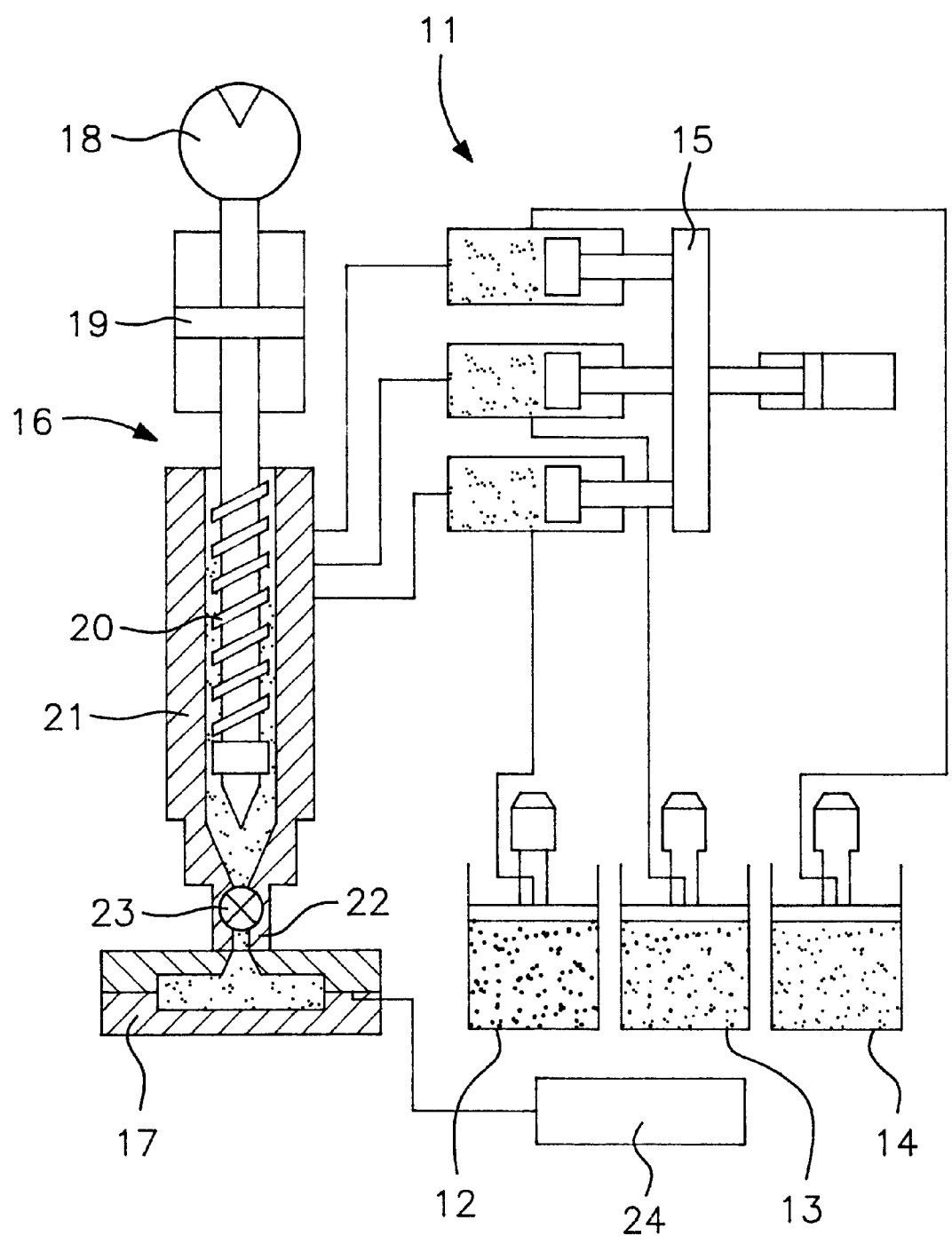
FIG. 1 is a diagram of injection molding system.

As to a plane sheet, any type of porous carbon plate and ion-exchange membrane can be used in the present invention as an electrode or a separator for fuel cells. Any type of porous carbon plate can be used. Generally, porous carbon plate can be classified into two typical kind of plates. One is a carbon plate made of carbon powder which is bound using resin such as phenol resin or the like and then the plate is burnt to make final porous carbon plate. This type of porous carbon plate has a closed cell (or unicellular foam). So liquid rubbers having even relatively low viscosity can not easily enter into the inside of the porous carbon plate. Even gas can not penetrate through the carbon plate.

Another type of porous carbon plate is made of carbon fiber which is immersed in a liquid such as an aqueous dispersion of polytetrafluoroethylene resin, and then the immersed carbon fiber is dried and press-molded to make final porous cabon plate. This type of porous carbon plate has relatively high porosity when compared with former one. So liquid rubbers having relatively low viscosity can enter and relatively easily penetrate into the inside of the carbon plate. Polytetrafluoroethylene resin acts as a repellent of water produced in electrochemical reaction or liquid electrolytes, to prevent the electrode from wetting.

As to the ion-exchange membranes, any type of membranes can be used, but membranes made of fluoropolymer is generally used for fuel cells.

As to a liquid rubber which can be used in the present invention, various kind of liquid rubber can be used such as a liquid silicone rubber, a liquid perfluoro rubber, a liquid nitrile rubber, a liquid ethylene-propylene-diene rubber, a liquid fluoro-rubber or the like. However a liquid perfluoro rubber and a liquid silicone rubber can be preferably used in the present invention. These liquid rubbers have a relatively low viscosity and can easily be injection-molded. These liquid rubbers can flow easily in a mold so that molding pressure at molding is relatively low enough to prevent the carbon plate, which is placed in the mold, from collapse by a molding pressure. Other molding methods such as compression molding or transfer molding can also be used.

As to the hardness of the vulcanizate of the liquid rubber, preferably hardness (JIS A) not more than about 60, more preferably within the range of about 40 to about 5, is selected. This is because sealing performance of these vulcanizates can be achieved even at relatively low contact sealing pressure. However, liquid perfluoro-rubber, which contains polytetrafluoroethylene fine powder, and having a hardness more than about 60 can be used when an excellent anti-gas permeability is required.

The vulcanizates having a hardness not more than 60 can be made of a liquid rubber such as a liquid silicone rubber having a viscosity of not more than about 500 Pa·s, preferably within aviscosity of from about 300 to about 30 Pa·s (at 25° C.), a liquid perfluoro rubber having a viscosity of not more than 10,000 Pa·s, preferably not more than 1000 Pa·s (at 25° C.), a liquid nitrile rubber, a liquid ethylene-propylene-diene rubber, a liquid fluororubber or the like. Liquid silicone rubbers and liquid perfluoro rubbers can preferably be used in the present invention. Liquid rubbers having these range of viscosity can easily enter or interpenetrate into porous carbon plate and has an excellent formability or moldability due to its low viscosity. Polytetrafluorotethylene fine powder can be added into liquid perfluoro rubber as a repellant of aqueous electrolytes or water produced during electrochemical reactions and as a filler which decreases permeability coefficient.

As to the polytetrafluoroethylene fine powder, average particle diameter within the range of from about 20 µm to about 40 µm can preferably be used.

These liquid rubbers are commercially available. For instance, liquid silicone rubber are supplied under the name of KE1950-20(A·B) or KE1950-10(A·B) (heat curable two-type liquid rubber) by Shinetsu Chemicals Co. As for liquid perfluoro rubber, X-70-709 and SIFEL 3500 (A·B) (heat curable two-type liquid rubber) are supplied by the same company. In the case of two-part liquid type perfluoro rubber such as SIFEL 3500, rubber component having the viscosity not more than $10^4$ Pa·s is preferably used.

X-70-709 and SIFEL 3500 (A·B) has a following basic chemical structure I (perfluoro ether) in its main chain.

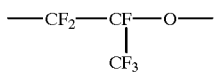

I

KE1950-20(A·B) and KE1950-10(A·B) have a following basic chemical structure II in their main chain.

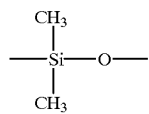

II

These liquid rubbers can be vulcanized by injection molding or the like. These liquid rubbers are, for example, injected into the groove formed on the surface of the sheet (plate), using a mold having a groove corresponding to the protrusion of the gasket. Injection molding can be carried out at a relatively low injection pressure of about 2 to 20 MPa.

Molding can be, for example, carried out as follows.

Figure 11:
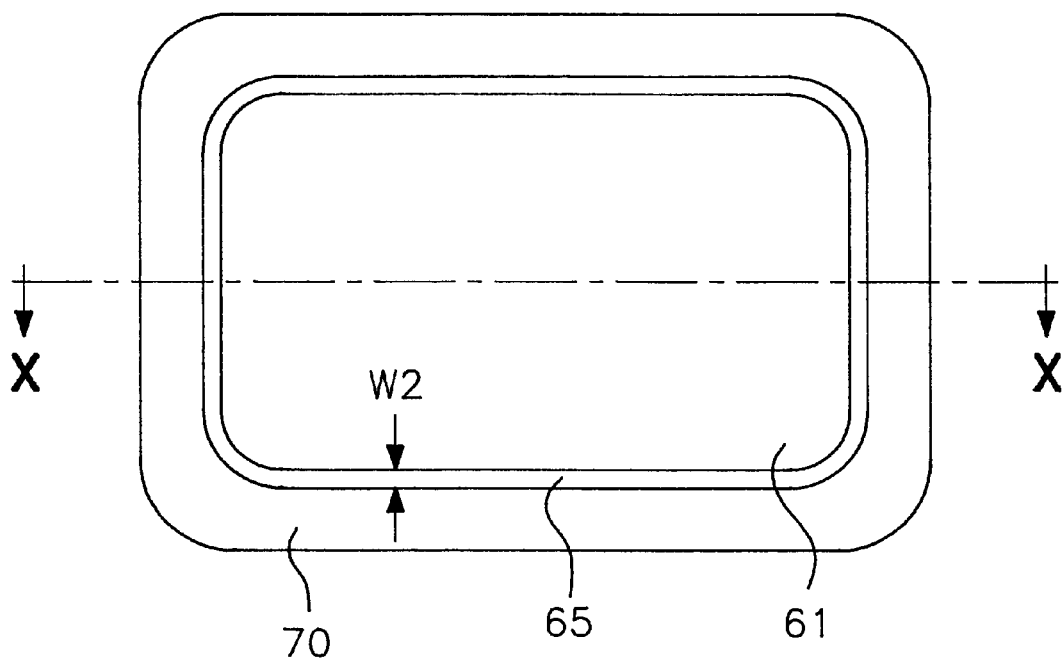
FIG. 11 is a plane view of a sheet with a groove placed on the surface of the sheet at a peripheral portion.
Figure 12:
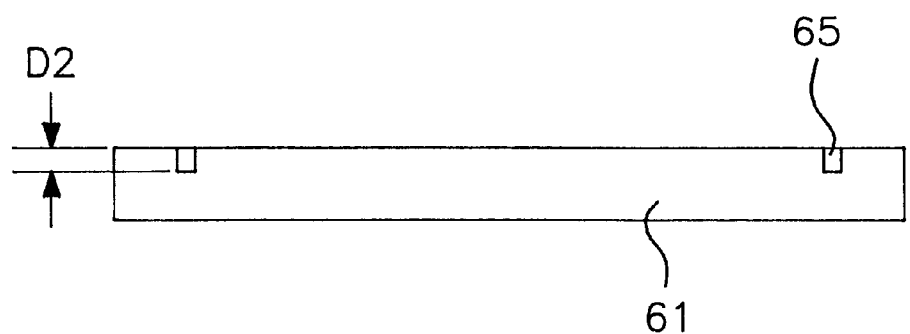
FIG. 12 is a cross-sectional view taken along the line X—X of FIG. 11.
Figure 13:
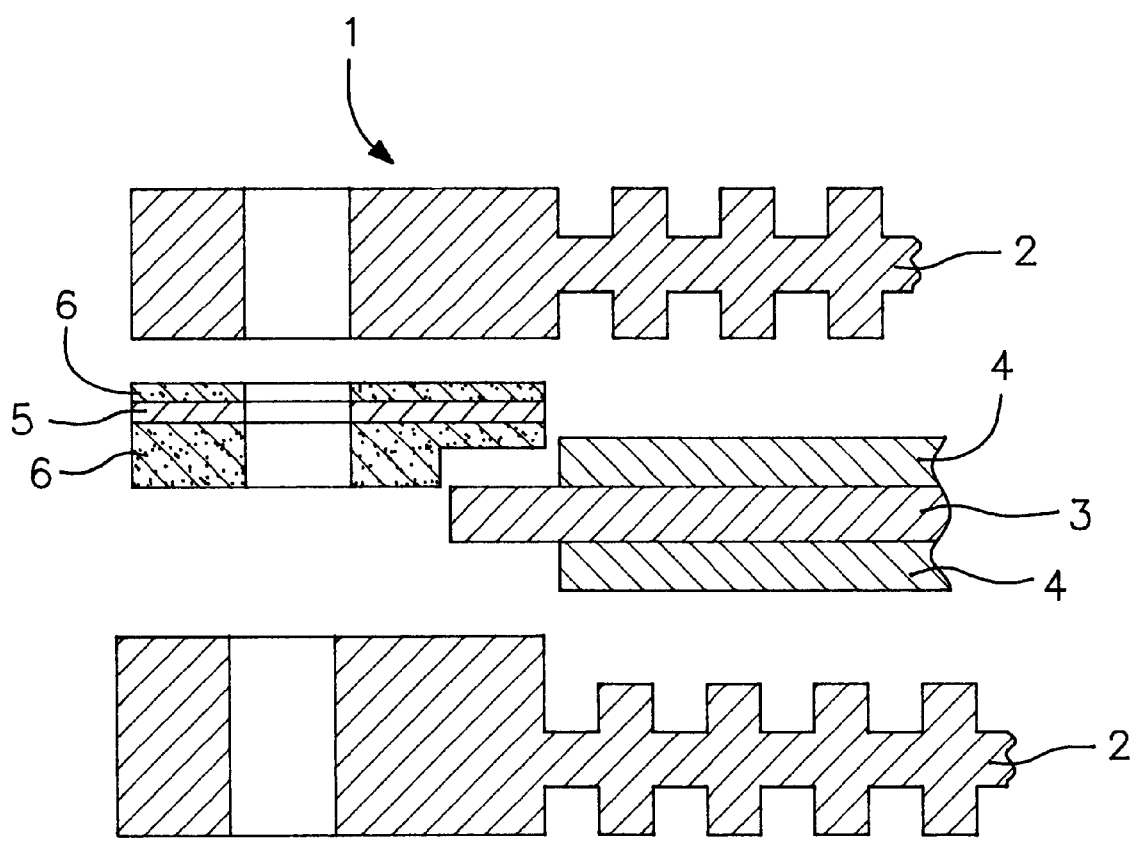
FIG. 13 is a cross sectional view of each component which is used in the conventional layer built fuel cells.

As is shown in FIGS. 11 and 12, on a surface of the plane porous carbon plate, for example, a groove 65 is provided along an inner part of an outer periphery 70 of the plate 61. The depth D2 of the groove 65 is within the range of about 0.05 mm to about 3 mm, preferably within the range of about 0.1 mm to about 1 mm. The width W2 of the groove 65 is within the range of about 1 mm to about 10 mm, preferably within the range of about 2 mm to about 5 mm. On or in the groove 65, gasket 63 having a convex shape (protrusion or lip) is formed as is shown in FIGS. 7 to 10. The shape of the protrusion 62 can be various shapes such as mountainous, inclined mountainous, mountainous with bifurcated peaks or the like. The width W1 of the protrusion in the vicinity of the foot thereof can be determined discretionary, however preferably within the range of about 0.2 mm to about 10 mm, more preferably about 1 mm to about 5 mm. The height h1 of the protrusion from the foot to the peak thereof can also be determined discretionary, however preferably within the range of about 0.1 mm to about 3 mm, more preferably about 0.2 mm to about 2 mm.

The gasket of the present invention has a base portion 64 tightly secured in the groove 65. The groove 65 is formed for preventing the gasket 63 from displacement from its initial position.

When the porous carbon plate made of carbon fiber is used as the sheet, the liquid rubber easily penetrate into the porous plate because the viscosity of the liquid rubber is low enough to enter into the plate. The gasket in this case is tightly secured in and on a portion where the liquid rubber is placed.

The gasket of the present invention can be made, for example, by the following steps using an injection molding machine, first closing molds (upper mold and lower mold) relatively loosely and then placing the nozzle of the injection machine on an inlet of the mold so as to make a closed space between these two molds, next sucking out air from the closed place between the upper and lower molds, then closing the molds, and then injecting liquid rubber into the mold.

Degree of vacuum in the closed space is set not more than 30 Torr, preferably not more than 20 Torr, more preferably not more than 10 Torr. Degree of vacuum is more than the value mentioned above, the weld line(s) tend to appear on gaskets produced, and bonding strength between the gasket and the sheet which has a void on the surface tends to be poor.

The gasket of the present invention can also be made in one body on both side of the porous sheet simultaneously by injection molding of liquid rubber on the sheet which have a plurality of hole in the sheet, the hole being connected between both plane surface of the sheet.

Figure 3:
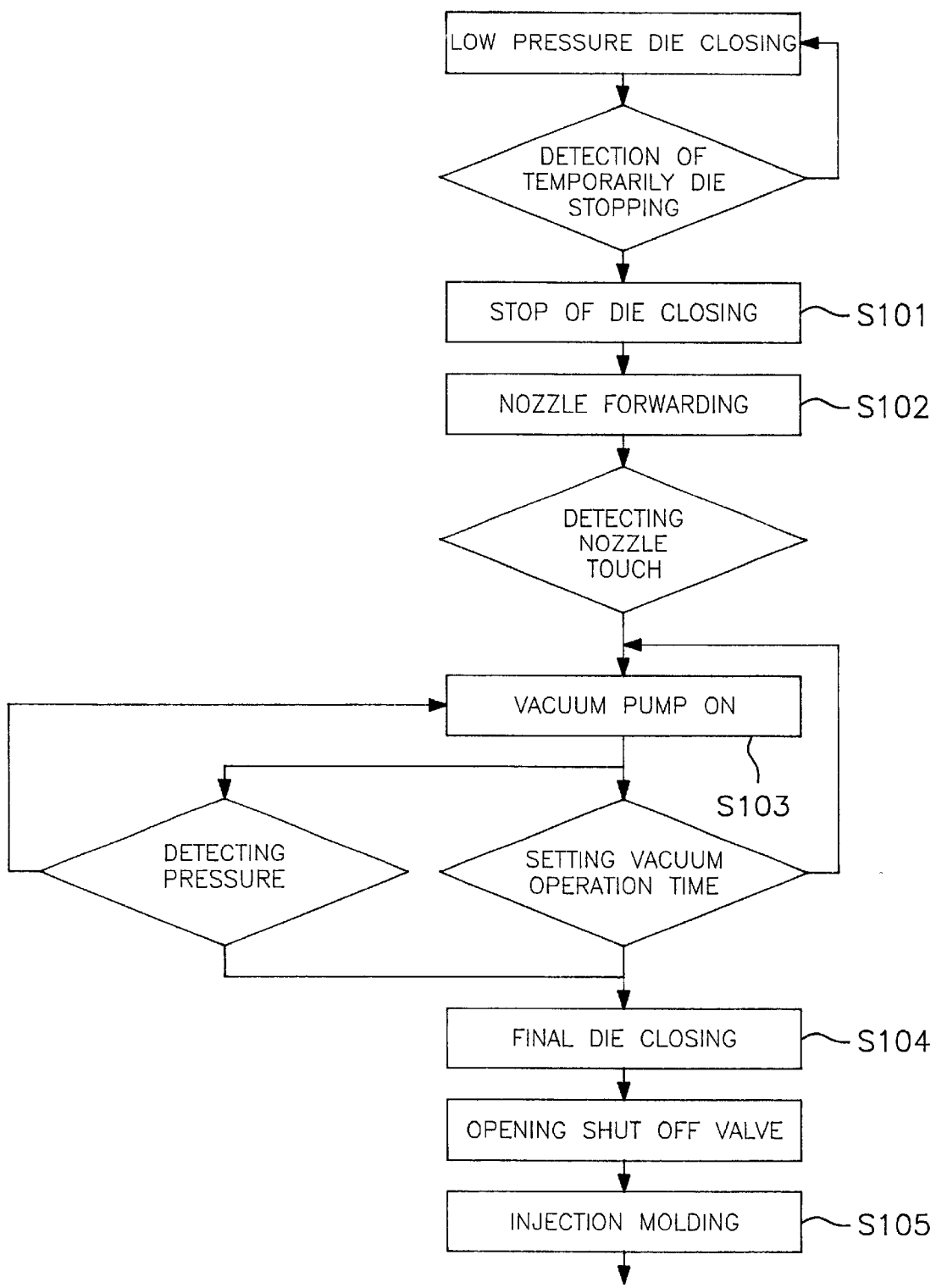
FIG. 3 is a diagram showing a flowchart of manufacturing process for making gaskets.

The injection machine has at least two molds (upper mold and lower mold). The two molds are placed face to face with an interspace not more than about 2 mm. Inner space between the two molds is closed by an o-ring or the like (step S 101, as shown in FIG. 3). Then the nozzle of the injection machine touches onto the inlet, through which liquid rubber enter into the mold, to shut off the space in the mold from outer environment(S 102, in FIG. 3). Then air in the closed space is vacuumed out through a passage made on a parting surface of the mold. A shut off valve is formed in the nozzle of the injection machine to prevent the liquid rubber from getting sucked into the mold through the inlet by a negative pressure (S 104, in FIG. 3). The molds are then completely closed after the pressure in the closed space becomes to a predetermined pressure (S 104, in FIG. 3). Liquid rubber is then injection-molded into the vacuumed space to mold a gasket.

The sheet is protected against damage because molding can be carried out at relatively low pressure, because liquid rubber have a low viscosity.

A porous sheet with two gaskets having each mountaineous or lip portions on both surfaces of the porous sheet can simultaneously be provided by injection molding a liquid rubber on one surface of the porous sheet. When the sheet is thin in thickness, and there is a need to form a gasket on both surface of the sheet, it is often difficult to form a gasket on one surface without damage of the sheet. This is because the sheet tends to be damaged if there is no support on the other side of the groove. It is possible to make a support portion in a mold to support the bottom of the other groove, but the cost to make a special mold tends to increase. And the structure of the mold becomes complex so that stable molding can not often be secured because the height of the gasket tend to fluctuate by a tolerance of the depth of the groove or a tolerance in mold manufacturing.

Figure 6:
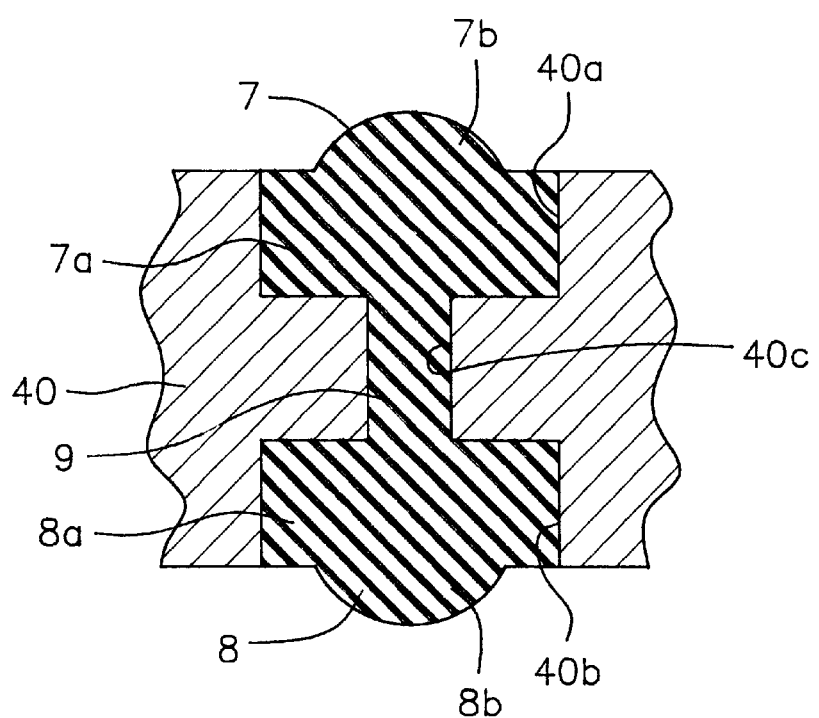
FIG. 6 is a cross sectional partial view of a porous sheet that has a gasket in the hole in FIG. 5.

To avoid these problems, holes penetrating through the sheet in the direction of its thickness are provided in the groove of the sheet. When liquid rubber is injected onto one of the groove of the surface of the sheet, liquid rubber also simultaneously runs through the holes into the other side of the groove to make another gasket. These gaskets are tightly secured on the sheet because these gaskets 7 and 8 engage with the holes 40c as shown in FIG. 6.

In the meantime when the porous carbon plate made of carbon fiber is used, liquid rubbers can be placed on a desired position of the surface of the carbon plate and then pressed by a mold and then heated it into vulcanizates.

The thus obtained porous carbon plates having a vulcanized sealing portion made of liquid rubber in the groove or on the surface of the porous carbon plate are used in fuel cells together with other components such as current-collecting electrodes, ion exchange membranes and reaction electrodes. The sealing portion can effectively seal a portion between each electrode or sheet.

EFFECT OF THE INVENTION

The gasket of the present invention is formed on the surface of the sheet in one body. So there is no need to place an additional seal or gasket on the sheet when the fuel cells is assembled. It is possible to place the gasket accurately in a predetermined position because the gasket of the invention is bonded tightly and held on a predetermined position of the sheet. There is no displacement or twist of the gasket of the invention. So it is possible to make the gasket thinner and slender.

Moreover hardness (JIS A) of the gasket of the present invention is preferably lower than about 60, so that sealing ability can be achieved even at relatively low sealing pressure (about 0.5 MPa). This lead to that the carbon plate is not damaged by the sealing pressure.

The liquid perfluoro rubber has an excellent chemical resistance and an excellent heat resistance so that the gasket made of liquid perfluoro rubber of the invention has an excellent resistance for use in a phosphoric acid-type fuel cell in which concentrated phosphoric acid is used at about 200° C.

The gas permeability of the liquid perfluoro rubber can be improved considerably with the amount of polytetrafluoroethylene fine powder in its composition. The fuel cell is required to decrease fuel (gas) leaking from fuel cells device, so these type of composition having an excellent anti-gas permeability are desirable for use in fuel cells.

In addition, there is no need to use an adhesive, because the porous carbon plate has a void in itself. These void acts like a anchor to secure relatively strong bonding with the liquid rubber vulcanizate. The liquid rubber can enter into these voids because the liquid rubber has relatively low in viscosity. Absence of adhesives is desirable for fuel cells because adhesives may contaminate fuel cells to decrease the efficiency of power generation. However adhesives may be used if adhesives do not exert a crucial damage on fuel cells.

When there is no void on the surface of the carbon plate as is the case of the porous carbon plate made of carbon powder, voids that exist inside of the porous carbon plate appear on the surface by cutting the surface.

When liquid rubber is used in the porous carbon plate made of carbon fiber, the liquid rubber penetrates into the porous carbon plate and fill up the void. The portion where liquid rubber fill up becomes non-air-permeate portion which can prevent gas or liquid from leaking through the portion. And this portion also becomes a gasket portion.

Examples of the sheets in the invention are component parts of layer-built fuel cells such as plate-like porous electrodes, polymeric solid electrolytic membranes (ion-exchange membranes), separators, cooling plates, modules, manifolds or the like. Porous electrodes made of carbon are preferably used as the member to be sealed in the invention. Sealing can be secured under a contact pressure less than the buckling strength of the electrode when pressure is applied in the direction of the thickness of the porous carbon plate.

More specifically, sealing materials (or gaskets) are made of elastic materials so that sealing materials can sealingly face-contact with another plate at a relatively low contact pressure even if there is somewhat undulation on the surface of the gasket.

Curing or vulcanizing of the sealing materials is carried out after the materials infiltrate into the void, so that bonding or adhesion between the sealing materials and the member to be sealed, can be physically and completely achieved.

Conventional sealing has been carried out by applying relatively greater contact pressure on a gasket. But in the present invention there is almost no compression buckling of the electrodes when compared with the conventional sealing methods. In addition to these advantages mentioned above, there is another advantage in processability in manufacturing fuel cells.

According to the process of the present invention, welding portion through which gas leakage ma occur, can be eliminated from the gasket because the molding is carried out under vacuum condition.

Vacuum condition is maintained because injection nozzle has a shut off valve, thereby even liquid rubber having a low viscosity can not inadvertently enter into the mold. Injection molding is carried out under vacuum condition so that welding portion in the gasket can effectively be eliminated, and also strong adhesion between the sheet and gasket can be achieved because liquid rubber having a low viscosity can easily enter even into small convex-concave voids existing on the sheet surface. Welding portion tends to cause gas leakage.

When thin porous sheet is used to make two gaskets on both side of the sheet, two gaskets on both side of the sheet can simultaneously be made by providing a hole or holes which is or are formed in the thin porous sheet. The liquid rubber can flow onto predetermined places on both surfaces of the sheet through the hole or holes.

Still more, the sealing materials in the present invention can be used for various seals such as for separators in fuel cells, modules which combine several fuel cells in one body, cooling plates which remove generated heat during power generation or the like.

EMBODIMENT

The present invention will be explained by referring embodiments.

REFERENCE EMBODIMENT

Ingredients

Liquid Perfluoro-rubber:SIFEL 3500 (A·B) manufactured by Shinetsu Chemicals Co. Tow-type liquid perfluoro-rubber (thermosetting type) Liquid A:about 120 Pa·s (curing component) Liquid B: about 700Pa·s poise (rubber component)

Polytetrafluoroethylene:Molding powder M-12 manufactured by fine powder Daikin Co. (average diameter: 25 $\mu$m)

Into the Liquid A, a predetermined weight of polytetrafluoroethylene fine powder (0, 10, 20, 30 or 50% by weight based on the total amount of a composition) was added and then blended by kneader. Then the equal amount of the Liquid B which is equal amount of the Liquid A, was added into the blended compounds to produce the compositions which contain various amount of polytetrafluoroethylene fine powder.

Physical properties of vulcanizates were then measured as follows.

Contact Angle:

The compositions were press-cured for 30 minutes at the temperature of 150° C., to obtain sheets having thickness of 1 mm. Contact angles of the sheets were measured using a contact angle meter (produced by Kyowa Surface Chemical Co.). Contact angle is a value to estimate the degree of repulsion of water. The rate of the electrochemical reactions of fuel hydrogen gas increases with increasing the degree of water repulsion. The rate of leakage of aqueous electrolytes via gaskets or through a gap between each gasket will also increase with decreasing the degree of water repulsion.

Permeability Coefficient of Gas:

The compositions were press-cured for 30 minutes at the temperature of 150° C., to obtain sheets having thickness of 1 mm. Permeability coefficients of nitrogen ($N_2$) of the sheets were measured at 25° C. using a gas permeability tester. The unit of the permeability coefficient of nitrogen gas is shown in $cm^3/cm^2 \cdot sec \cdot Pa$.

Hardness (JIS A):

The compositions were press-cured for 30 minutes at the temperature of 150° C., to obtain sheets having thickness of 1 mm. The hardness of vulcanizates were measured based on JIS K-6253.

Test results are shown in next Table.

TABLE

| Compound No | PTFE fine powder added (% by weight) | Contact angle (degree) | Gas permeability coefficient ($cm^3/cm^2 \cdot sec \cdot Pa$) | Hardness |
|---|---|---|---|---|
| 1 | 0 | 40 | $0.96 \times 10^{-13}$ | 50 |
| 2 | 10 | 65 | $0.20 \times 10^{-13}$ | 55 |
| 3 | 20 | 80 | $0.07 \times 10^{-13}$ | 63 |
| 4 | 30 | 90 | $0.05 \times 10^{-13}$ | 78 |
| 5 | 40 | 95 | $0.05 \times 10^{-13}$ | 90 |

EMBODIMENT 1

Ten (10) percent by weight of an aqueous dispersion of polytetrafluoroethylene (Teflon 30-J by Mitsui Dupont Fluorochemical Co.) based on the total amount of both aqueous dispersion and a chopped carbon fiber (M 201 by Kureha Chemical Co.: average length of fiber 130 $\mu$m, average diameter of fiber 12.5 $\mu$m) was infiltrated into the chopped carbon fiber, the infiltrated carbon fiber was dried at 50° C. Then it was press-molded at 400° C., thereby obtaining a porous carbon sheet (degree of porosity, 55%) having a thickness of 0.5 mm.

The porous carbon sheet was placed at a bottom of an inner hollow cylinder, and then the mixture of the equal amount of the compound 1 (as shown in Table, Liquid A and Liquid B (SIFEL 3500(A·B))) was coated on the porous carbon sheet in a circle, around the outer periphery of the porous carbon sheet. Then the porous sheet was pressed into the total thickness of 0.8 mm using another cylinder which had a flat end surface. Then curing was carried out in an oven for 30 minutes at 150° C.

The total thickness of the products was 0.75 mm when measured after curing. Fracture was observed in the inside of the porous carbon sheet when bonding strength (JIA K 6256) of the product was tested. There was no fracture in the interface between the rubber portion and the porous carbon portion, thereby it can be concluded that the bonding strength between the rubber and the porous carbon sheet is excellent. Furthermore, when gasket-like seal portion of the products were cut and observed under a microscope, it was confirmed that vulcanizates of the liquid perfluoro-rubber interpenetrated into and fill up almost completely the porous portion of the porous carbon sheet. The thickness of the rubber portion of the gasket-like seal portion was 0.25 mm, as against the aimed thickness of 0.3 mm.

EMBODIMENT 2

In the embodiment 1, compound No.3 was used instead of compound No.1. The total thickness of the sealing portion of the product was 0.83 mm. Fracture was observed in the inside of the porous carbon sheet. This phenomenon shows the bonding strength is excellent.

EMBODIMENT 3

In Embodiment 1, compound No.5 was used instead of compound No.1. The total thickness of the sealing portion of the product as 0.85 mm. Fracture was observed in the inside of the porous carbon sheet when bonding test was carried out. This phenomenon shows bonding strength is excellent.

EMBODIMENT 4

Twenty (20) percent by weight of solvent naphtha based on the weight of the polytetrafluoroethylene powder (Polyflone, by Daikin Co.) was added to the polytetrafluoroethylene powder, and then the thus obtained paste-like mixture was extruded at 150° C. The extruded sheet was stretched to 200% at a room temperature and then the 200% stretched sheet was baked for 10 minutes at 340° C., to obtain a stretched porous sheet (0.35 mm in thickness and 62% of porosity) made of polytetrafluoroethylene. The thus obtained stretched porous sheets have an excellent flexibility. The porous portion of the sheets was relatively easily collapsed by pressure, to be a sealant having an excellent sealability.

Twenty (20) percent by weight of the mixture consisting of Liquid A and Liquid B of the liquid perfluoro-rubber (SIFEL 3500) based on the weight of the stretched porous sheet was infiltrated into the stretched porous sheet. And then the porous carbon sheet having thickness of 0.5 mm which was obtained in Embodiment 1 was placed on the stretched porous sheet. Vulcanization was carried out, by setting the thickness of the vulcanizates to 0.7 mm, for 30 minutes at 150° C., as is shown in Embodiment 1.

Similar adhesive failure tests as shown in Embodiment 2 were carried out on the vulcanizates. Fracture was observed in the inside of the porous carbon sheets. According to the results of the test, excellent adhesioness was confirmed.

EMBODIMENT 5

Figure 7:
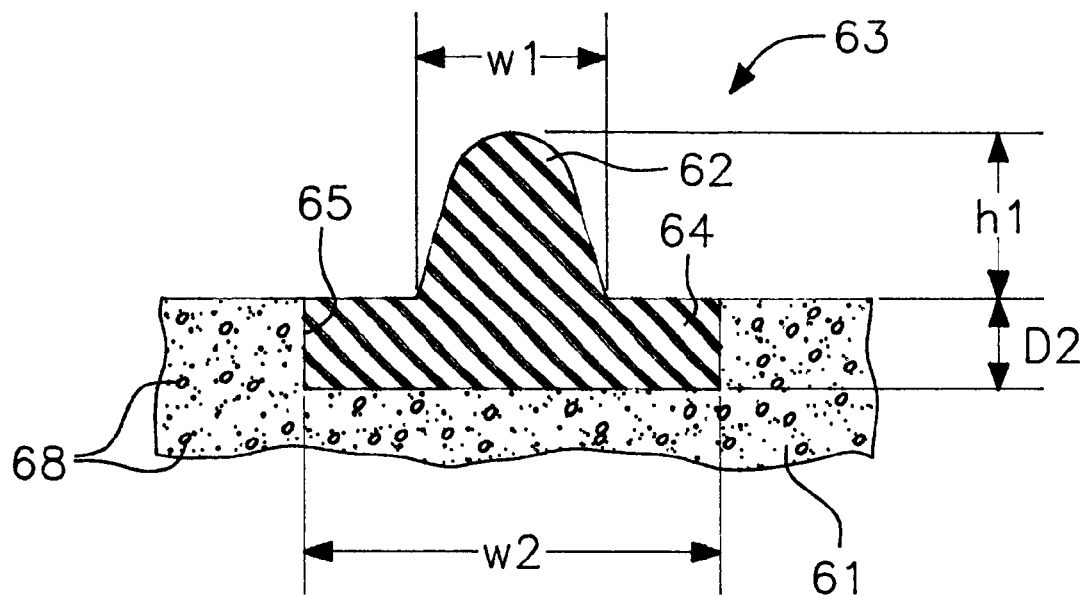
FIG. 7 is a cross sectional partial view of a gasket A provided on a sheet.
Figure 8:
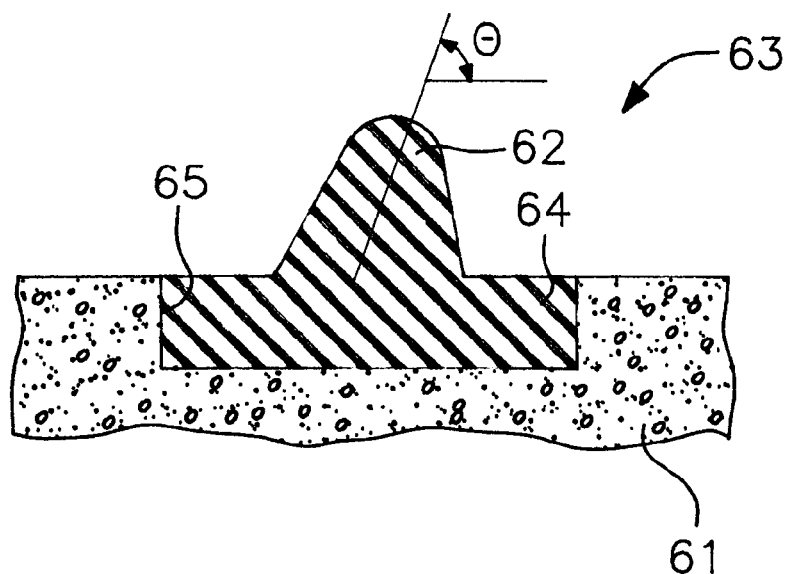
FIG. 8 is a cross sectional partial view of a gasket B provided on a sheet.

The surface of a resin-immersed type carbon plate (IKC-33 by Toyo carbon Co. thickness of the plate: 2 mm) was cut to make a groove (width W2: 3.0 mm, depth D2: 0.3 mm) 65 on the surface around an outer periphery of the plate (as shown in FIGS. 7~10 and 11). Injection molding was carried out in such a way similar to Embodiment 10 which will be described later. Liquid silicone rubber was injection molded into the groove at the pressure of 19.6 MPa using molds having predetermined shapes, to obtain various carbon plate with a gasket (A~D) made of silicone rubber and combined with the plate in one body.
Carbon Plate with Gasket A:

Gasket A is a standard type in shape, the lip or mountainous portion 62 of the gasket 63 is approximately symmetrical with respect to a vertical line as shown in FIG. 7. The gasket A is compressed approximately downward when used. The root portion 64 of the gasket 63 is embedded in the groove 65 of the carbon plate 61. Dimensions of the lip are as follows, h1:2 mm, W1:2 mm. Small circles 68 are void in the porous carbon sheet.
Carbon Plate with Gasket B:

Gasket B has a lip somewhat slanting toward outward or inward direction relative to the plate as shown in FIG. 8. The lip or mountainous portion 62 slants somewhat right-hand side as shown in FIG. 8. Other reference numerals are same as in FIG. 7. Slanting angle θ is 70°. Other dimensions of the lip are the same as the carbon plate with gasket A.
Carbon Plate with Gasket C:

Gasket C has two small lips 67 placed in parallel manner in the top of the mountain 66 as shown in FIG. 9. The two small lips 67 are approximately symmetrical with respect to a vertical line. This type of gasket can seal with relatively low sealing pressure. Other reference numerals are same as in FIG. 7. Dimensions of the lip are as follows, h1:2 mm, h2: 0.7 mm,
Carbon Plate with Gasket D:

Gasket D has two small lips 77 placed in parallel manner in the top of the mountain 66 as shown in FIG. 10. The two small lips 77 slants outward direction relative to the mountain 66 in FIG. 10. Slanting angle θ of the small lip is 70°. Other dimensions are the same as the carbon plate with gasket C.

Liquid silicone rubber (KE1950-20(A·B) by Shinetsu Chemicals Co.) used in this embodiment is translucent, has a viscosity of about 150 Pa·s (at 25° C.), and gives hardness (JIS A) of 20 after the liquid silicone rubber is vulcanized. Injection molding was carried out in a mold at 150° C for 60 seconds.

EMBODIMENT 6

In Embodiment 5, instead of the liquid silicone rubber (KE1950-20(A·B)), another liquid silicone rubber (KE1950-10(A·B) by Shinetsu Chemicals Co.) which is translucent, has a viscosity of about 60 Pa·s (at 25° C.) and gives hardness (JIS A) of 13 after the liquid silicone rubber is vulcanized, was used.

EMBODIMENT 7

In Embodiment 5, instead of the liquid silicone rubber (KE1950-20(A·B)), another liquid silicone rubber (X-70-709, by Shinetsu Chemicals Co.) which is translucent, has a viscosity of about 30 Pa·s (at 25° C.) and gives hardness (JIS A) of 35 after the liquid silicone rubber is vulcanized, was used.

EMBODIMENT 8

In Embodiment 5, instead of the liquid silicone rubber (KE1950-20(A·B)), liquid perfluoro rubber (SIFEL 3500 (A·B)), by Shinetsu Chemicals Co.) which has a viscosity of about 400 Pa·s (at 25° C.) and gives hardness (JIS A) of 50 after the liquid perfluoro rubber is vulcanized, was used.

EMBODIMENT 9

In Embodiment 5, instead of the liquid silicone rubber (KE1950-20(A·B)), liquid perfluoro rubber (SIFEL 3500 (A·B), by Shinetsu Chemicals Co.) which has 10% by weight of polytetrafluoroethylene fine powder and gives hardness (JIS A) of 55 after the liquid perfluoro rubber is vulcanized, was used. The viscosity at 25° C. of this compound was about 500 Pa·s.

COMPARATIVE EXAMPLE 1

In Embodiment 5, instead of the liquid silicone rubber (KE1950-20(A·B)), another liquid silicone rubber (KE1950-70 (A·B), by Shinetsu Chemicals Co.) which is translucent, has a viscosity of 750 Pa·s (at 25° C.) and gives hardness (JIA A) of 68 after the liquid silicone rubber is vulcanized, was used.

Properties other than hardness (JIS A) of the vulcanized liquid rubbers are shown in Table 1. These rubber were press-molded at 150° C. for 10 minutes and then post cured at 200° C. for 4 hours.

TABLE 1

| Vulcanizate of Liquid silicone rubber | KE1950-20 | KE1950-10 | X-70-706 | KE1950-70 | SIFEL 3500 |
|---|---|---|---|---|---|
| Tensile strength (MPa) | 6.4 | 3.9 | 5.9 | 7.8 | 7.3 |
| Tearing strength (KN/m) | 30 | 13 | 10 | 49 | 11 |
| Elongation (%) | 900 | 700 | 400 | 350 | 300 |
| Specific gravity (–) | 1.10 | 1.08 | 1.88 | 1.15 | 1.89 |

The thus obtained carbon plate having gasket A~D were tested. The results of the test are shown in Table 2.

| Sealability | A gasket formed on a groove of a porous carbon plate was pressed to another plane carbon plate at 25% rubber compression ratio. Then leaking test using helium gas was carried out under the pressure of 0.2 MPa.<br>○:no leaking, Δ:unstable in sealing, X:leaking |
|---|---|
| Sealing pressure | A gasket formed on a groove of a porous carbon plate was pressed to another plane carbon plate at 40% rubber compression ratio. Sealing pressure was calculated from the stress of gasket.<br>○:less than 2N/mm of length of the gasket, Δ:2~5N/mm, X:more than 5N/mm |
| Contactability between gasket and a member to be sealed | A plane transparent glass plate was pressed to a gasket formed on a groove of plane carbon plate at 25% to 40% rubber compression ratio. Visual observation of the contact condition was made through the glass plate.<br>○:good, Δ:a little uneven, X:uneven |

TABLE 2

|  | Em. 5 | Em. 6 | Em. 7 | Em. 8 | Em. 9 | Comparative example 1 |
|---|---|---|---|---|---|---|
| Carbon plate with gasket A | | | | | | |
| Sealability | ○ | ○ | ○ | ○ | ○ | ○ |
| Sealing pressure | ○ | ○ | ○ | ○ | ○ | Δ |
| Contactability between gasket and a member to be sealed | ○ | Δ | ○ | ○ | ○ | ○ |
| Carbon plate with gasket B | | | | | | |
| Sealability | ○ | ○ | ○ | ○ | ○ | ○ |
| Sealing pressure | ○ | ○ | ○ | ○ | ○ | Δ |
| Contactability between gasket and a member to be sealed | ○ | ○ | ○ | ○ | ○ | ○ |
| Carbon plate with gasket C | | | | | | |
| Sealability | ○ | ○ | ○ | ○ | ○ | ○ |
| Sealing pressure | ○ | ○ | ○ | ○ | ○ | Δ |
| Contactability between gasket and a member to be sealed | ○ | ○ | ○ | ○ | ○ | ○ |
| Carbon plate with gasket D | | | | | | |
| Sealability | ○ | ○ | ○ | ○ | ○ | ○ |
| Sealing pressure | ○ | ○ | ○ | ○ | ○ | Δ |
| Contactability between gasket and a member to be sealed | ○ | ○ | ○ | ○ | ○ | ○ |

COMPARATIVE EXAMPLE 2

A gasket having a round shape in cross section and made of clay-like black colored fluoro rubber (mixture of fluoro rubber E60C by Dupont, MT carbon black, $Ca(OH)^2$ and MgO) was placed on a carbon plate, and then similar tests were carried out. The test results showed a good sealability (○), a poor sealing pressure (X) and a little uneven in contactability (Δ).

COMPARATIVE EXAMPLE 3

A gasket having a round shape in cross section and made of clay-like black colored cellular nitrile rubber was placed on a carbon plates, and then similar tests were carried out. The test results showed a rather poor sealability (Δ), a rather poor sealing pressure (Δ) and a little uneven in contactability (Δ).

Properties of the fluoro rubber and the cellular nitrile rubber used in Comparative Example 2 and 3 are shown in Table 3.

TABLE 3

|  | Fluoro rubber | Cellular nitrile rubber |
|---|---|---|
| Hardness (JIS A) | 70 | 35 |
| Tensile strength (Mpa) | 14.5 | 1.4 |
| Tearing strength (KN/m) | 26 | — |
| Elongation (%) | 230 | 160 |
| Specific gravity (–) | 1.85 | 0.82 |

EMBODIMENT 10

In FIG. 1, a liquid injection molding machine 11 which can be effectively used in the present invention. A plunger 15 transports liquid rubber, colorant and curing agent from liquid rubber tank 12, colorant tank 13 and curing agent tank 14 to the injection machine 16. These materials are injected from the machine 16 into the mold 17, to manufacture a gasket. The injection machine 16 has an oil motor 18, a screw 20 driven by an injection cylinder 19 and an injection tube 21. In a nozzle 22 in the tip portion of the injection tube 21, there is a shut-off valve 23 that opens and shuts to control flow of liquid rubber composition into the mold 17. A vacuum pump 24 is connected to the mold 17.

Figure 2:
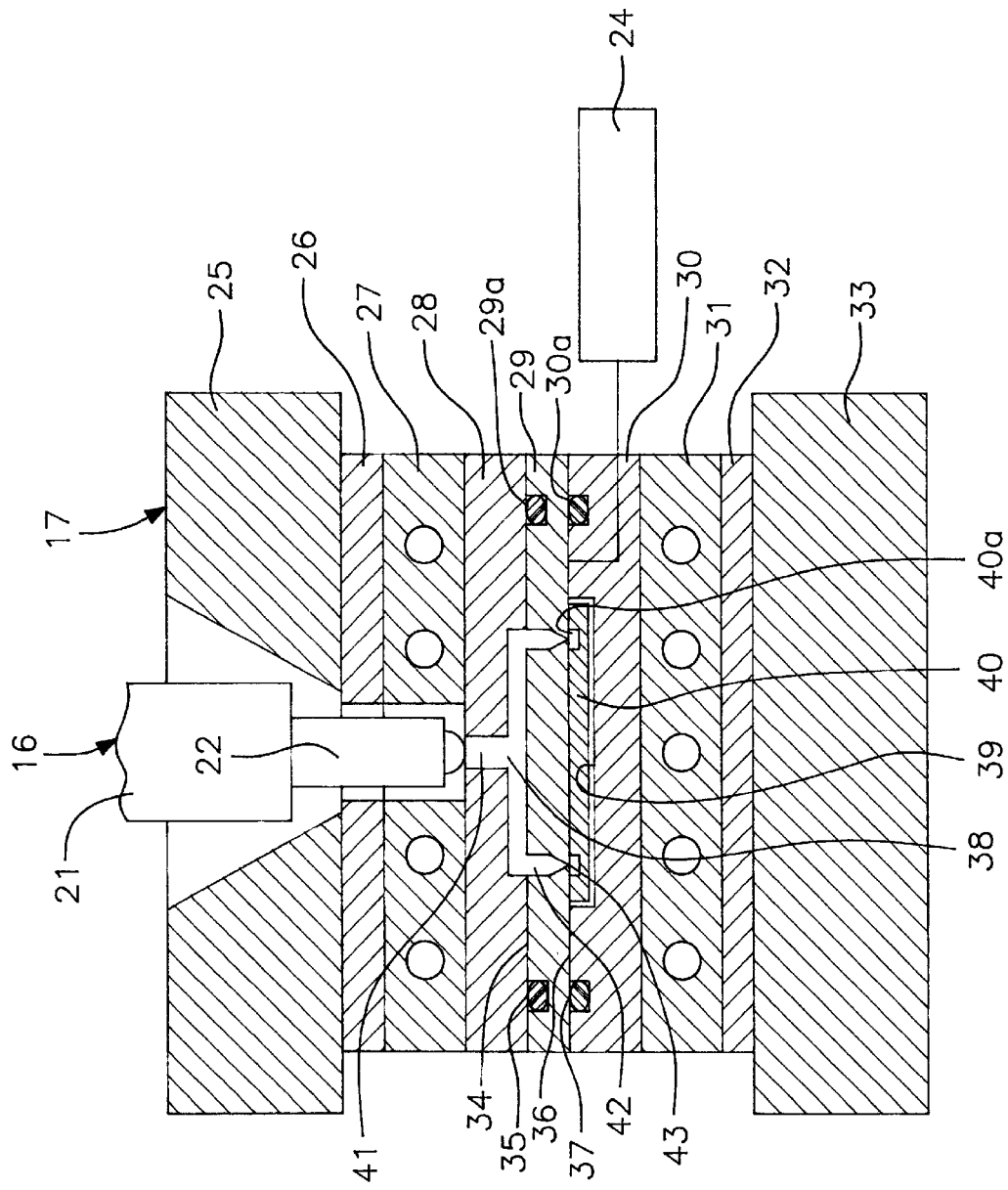
FIG. 2 is a cross sectional view of the mold of the injection molding.

FIG. 2 shows the detail of the mold 17. An upper platen 25, a thermal insulating plate 26, an upper thermal plate 27, an upper die 28, an intermediate die 29, a lower die 31, another thermal insulating plate 32 and a lower platen 33 are placed in this order. A parting face 34 between the upper die 28 and the intermediate die 29 is sealed by an o-ring (sealing means) 35 fitted in a fitting groove 29a on the upper face of the intermediate die 29. A parting face 36 between the intermediate die 29 and the lower die 30 is sealed by another o-ring 37 fitted in a groove 30a on the surface of the lower die 30. A closed space 38 closed by the o-ring 35 and 37 is in vacuum by the vacuum pump 24. There is a cavity 39 on the surface of the lower die 30. In the cavity 39 a porous carbon plate (sheet) 40 is set. The upper surface of the plate 40 has a groove (cutted groove) 40a or concave portion into which liquid rubber (molding composition) flows via a spool 41, a runner 42 and a gate 43, thereby a gasket is molded. The gasket is unitized with the porous carbon plate 40 when molded. Example of the plate is a current-collecting electrode (separator) 2 of the fuel cells, an ion-exchange membrane 3 interposed between the current-collecting electrode 2 or a reaction electrode 4 which is fixed to the ion-exchange membranes or the like. The porous carbon plate is made of carbon or graphite. The groove 40a is formed for preventing displacement of the gasket from its initial place in use. If there is no displacement of the gasket in use there is no need to form the groove.

FIG. 3 shows a control diagram. In die closing process, die closing operation is once stopped at a predetermined position (S 101 in FIG. 3) before final die closing operation. During this die stopping operation, dies are left at a predetermined position from each other using a die holding means. This predetermined position is set to make contact the o-ring 35 and 37 with each of the upper and lower die, and is set to make the length of the interspace between the parting face 34 and 36 into not more than 2 mm. This predetermined position does not let environmental air flow into the closed space 38 during vacuum operation. Then the nozzle 22 makes ahead toward the mold to touch the upper mold 28 (S 102 in FIG. 3). The contact strength of the nozzle 22 to the upper mold 28 is set in a range not to cause air leakage from the environment, generally is set not less than 2 KN. Thereby the closed space is shut completely from the environment except the the passage which is connected to the vacuum pump 24.

The vacuum pump 24 starts to operate after the contact strength of the nozzle 22 to the upper mold and a limit switch operates or after a predetermined time from the making-ahead operation of the nozzle 22 (S 103 in FIG. 3). During the vacuum operation, the shut-off valve 23 (closing means) in the nozzle 22 is shut so as not to let the molding compound flow into the mold.

After a predetermined period of time(for example not less than about 15 seconds) from the beginning of the vacuum operation or a predetermined vacuum pressure (for example not more than about 10 Torr) is attained, further-die-closing operation is carried out (S 104). The pressure of the further-die-closing operation is not more than the pressure the porous carbon plate 40 is damaged even if the molding compound is injected into the mold. The pressure should also be set to the pressure not more than that of the molding compound flowing out of the mold to make burr. It is desirable that the pressure is set not more than about 100 MPa when a porous carbon plate 40 having thickness of 2 mm made of resin-immersed type carbon plate (IKC-33, by Toyo Carbon Co.) is used. The dimensions of the width and the depth of the groove are 3.0 mm and 0.3 mm respectively.

The molding composition can preferably be selected from silicone type liquid rubber or perfluoro type liquid rubber. Experiment was carried out using silicone type liquid rubber (KE1950-20(A·B)) having viscosity of 150 Pa·s (at 25° C.) and having ahardness of 20 (JIS A) after curing. Injection molding was carried out at about room temperature so as not to cause curing reaction (for example at the temperature not more than 20° C.). Temperature of the mold was set at within the range of about 120° C. to 180° C., preferably at 150° C. The pressure of the injection molding is preferably within the range of about 2 to 30 Mpa, more preferably of about 20 MPa. The pressure of the injection molding of the Embodiment was carried out at 20 MPa. And curing time was 150 seconds.

The thus obtained gasket is formed on a groove 40a of the surface of a plain porous sheet 40 such as a current-collecting electrode 2 or an ion-exchange membrane 3 or a reaction electrode 4 combined with the ion-exchange membranes. The objects of the present invention can be achieved by the gasket having thin in thickness, an excellent processability in assembling fuel cells, difficulty indisplacement, an excellent sealability at low sealing pressure and uniform sealing pressure all around the gasket. The thus obtained gasket also has merits such as decreasing the number of parts, preventing displacement of gasket in long use under pressure, stabilizing the dimensions of the parts, decreasing problems in assemling fuel cells, decreasing instability and inefficiency in the operation of fuel cells due to inadvertent lack of parts in assembling, decreasing molding flaw, stability of processability in molding, improving in sealing ability, simplifying in mold structure, decreasing in step of molding, decreasing in step of adhesion, decreasing in cost, decreasing in cycle time, decreasing in leakage by burr or the like.

EMBODIMENT 11

Figure 4:
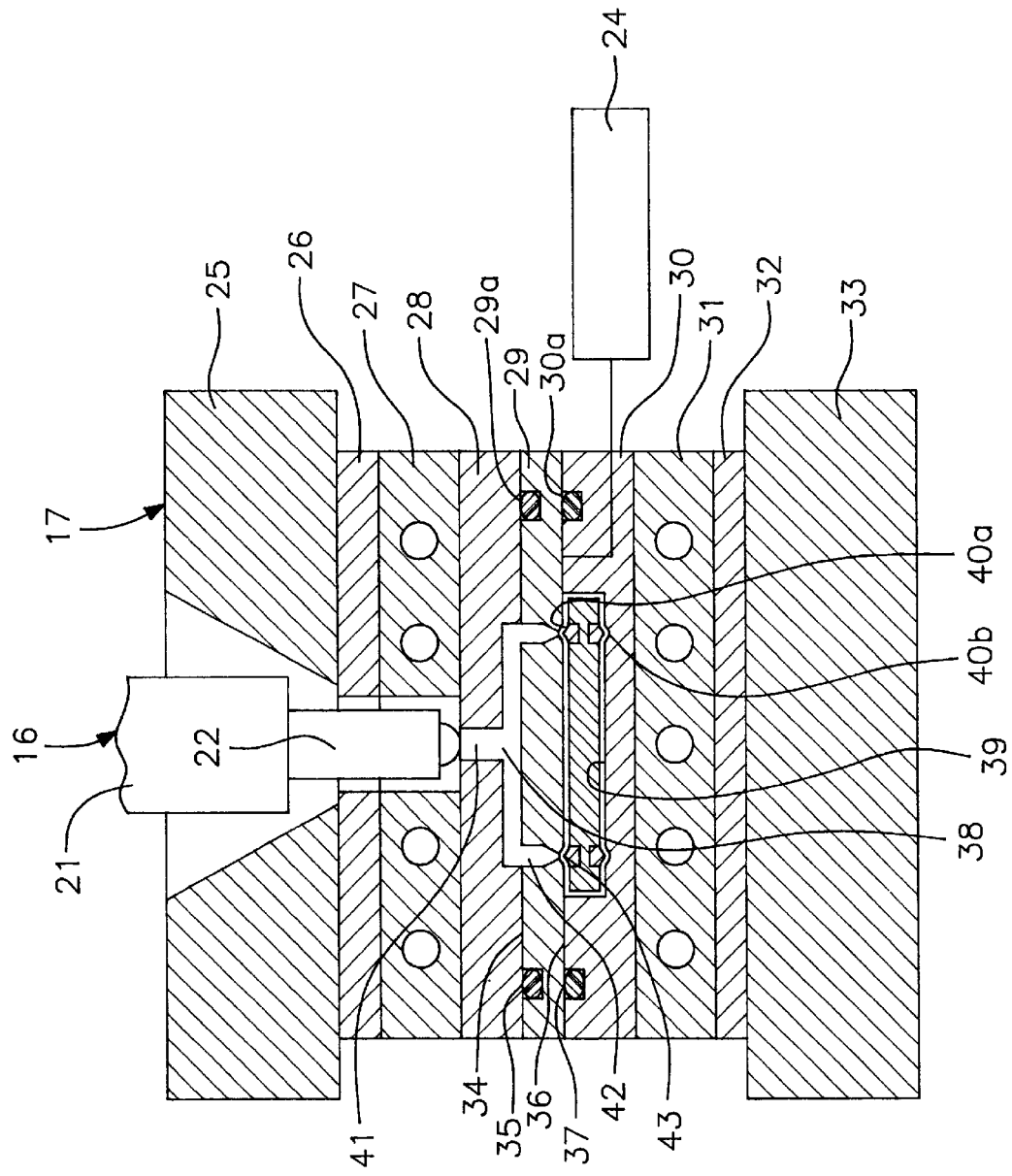
FIG. 4 is a cross sectional view of the mold of the second embodiment.
Figure 5:
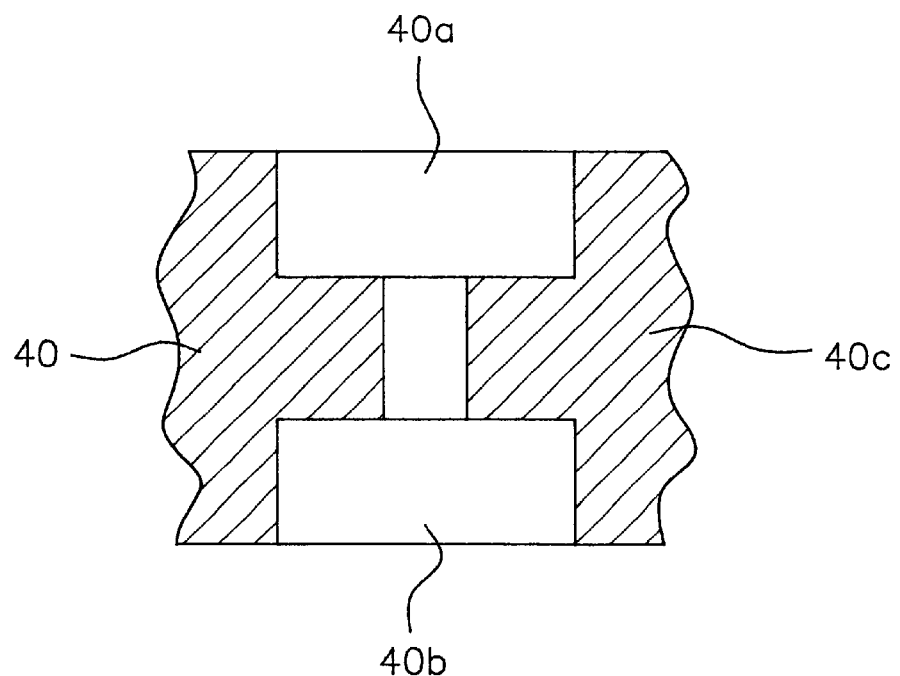
FIG. 5 is a cross sectional partial view of a sheet that has a hole connected both side of the sheet to secure the gasket in the sheet.

FIG. 4 shows another embodiment of the present invention. In the porous plain sheet 40, two grooves 40a and 40b are made on both side of the sheet respectively. As is shown in FIG. 5, grooves 40a and 40b is connected by a plurality of hole 40c at bottoms of the grooves. The diameter of the hole is about 1 mm. These holes is formed along the gasket at a intervals of about 10 to 20 mm.

As is shown in FIG. 6, when molding composition flows onto the sheet, two gaskets 7 and 8 are molded into two grooves 40a and 40b simultaneously via holes 40c in one body. This type of gasket also has merits such as thin in thickness, improving in assembling process, preventing displacement in use, an excellent sealability at low sealing pressure, uniform sealability all around the gasket. This type of gasket also has merits such as decreasing the number of parts, preventing displacement of gasket in long use under pressure, stabilizing the dimension of the parts, decreasing problems in assemling fuel cells, decreasing instability and inefficiency in the operation of fuel cells due to inadvertent lack of parts in assembling, decreasing molding flaw, stability of processability in molding, improving in sealing ability, simplifying in mold structure, decreasing in step of molding, decreasing in step of adhesion, decreasing in cost, decreasing in cycle time, decreasing in leakage by burr or the like.

The gasket 7 and 8 have foot portions 7a and 8a which are in grooves 40a and 40b, and seal portion or lip or mountainous portion 7b and 8b. These two gaskets are made in one body via rubber vulcanizates 9 formed in the holes 40c.

In this embodiment the foot portion 40a and 40b can be eliminated. If there is no foot portion, the holes 40c opens directly on both surfaces.

What is claimed is:

1. A gasket for layer-built fuel cells comprising:

a lip portion, and a base portion formed as a single body on and along said lip portion and placed in a groove formed at least on one of the surfaces of a sheet, the gasket being comprised of a vulcanizate of a composition comprising a liquid rubber selected from a group consisting of a liquid perfluoro rubber, a liquid silicone rubber, a liquid nitrile rubber, a liquid ethylene-propylene-diene rubber and a liquid fluoro rubber, the sheet being selected from a group consisting of a porous carbon sheet made of a carbon powder, a porous carbon sheet made of a carbon fiber and an ion-exchange membrane.

2. The gasket for layer-built fuel cells according to claim 1, wherein the liquid rubber having a viscosity of not more than about $10^4$ Pa·s at 25° C.

3. The gasket for layer-built fuel cells according to claim 2, wherein the vulcanizate has a hardness (JIS A) of not more than about 60.

4. The gasket for layer-built fuel cells according to claim 2, wherein the vulcanizate have a hardness (JIS A) of within the range of about 40 to 5.

5. The gasket for a layer-built fuel cells according to claim 2, wherein the composition comprises a perfluoro rubber having a viscosity of not more than about $10^4$ Pa·s at 25° C. and a polytetrafluoroethylene fine powder.

6. The gasket for layer-built fuel cells according to claim 1, wherein said lip portion has a mountainous shape in cross section.

7. The gasket for layer-built fuel cells according to claim 1, wherein said lip portion has an inclined mountainous shape in cross section.

8. The gasket for layer-built fuel cells according to claim 6, wherein said lip portion has bifurcated peaks.

9. A gasket for layer-built fuel cells comprising:

an upper lip portion, a lower lip portion, and a plurality of connecting portions formed in one body with said upper and lower lip portions and connecting said upper lip portion and said lower lip portion, wherein each of said upper and lower lip portions is formed on each of upper and lower surfaces of a sheet, and said connecting portion is formed in a hole connecting said upper and lower surfaces of said sheet, the gasket being comprised of a vulcanizate of a composition comprising a liquid rubber selected from a group consisting of a liquid perfluoro rubber, a liquid silicone rubber, a liquid nitrile rubber, a liquid ethylene-propylene-diene rubber and a liquid fluoro rubber, wherein the sheet is selected from a group consisting of a porous carbon sheet made of a carbon powder, a porous carbon sheet made of a carbon fiber and an ion-exchange membrane.

10. The gasket for layer-built fuel cells according to claim 9, wherein said gasket further comprises a foot portion formed in one body and placed in a groove of said sheet, said groove being directly connected to said hole.

* * * * *